May 17, 1966  R. D. ALLEN  3,251,471
SEWAGE DISPOSAL SYSTEM
Filed Aug. 27, 1962  2 Sheets-Sheet 1
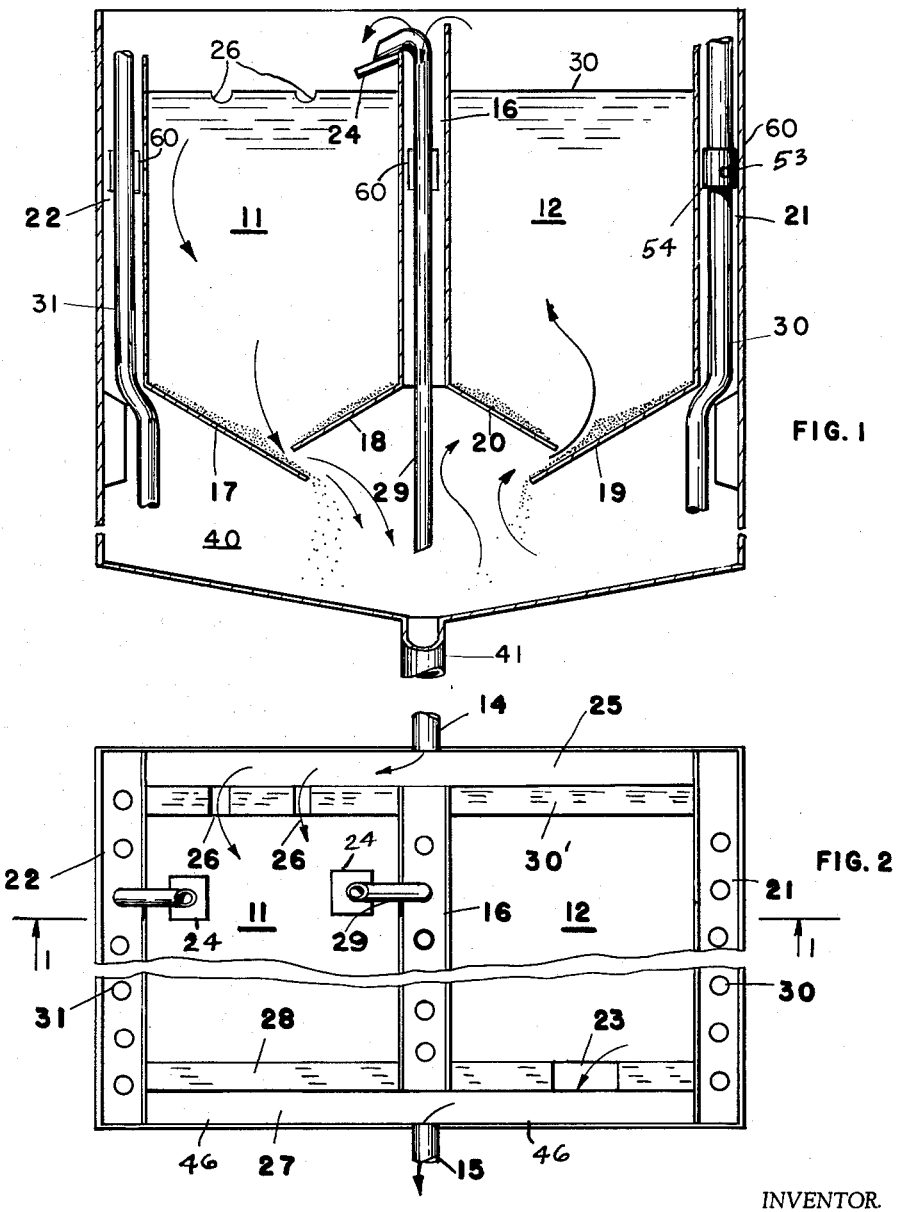
INVENTOR.
ROBERT D. ALLEN

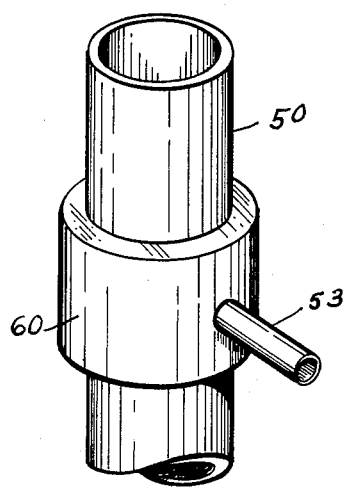
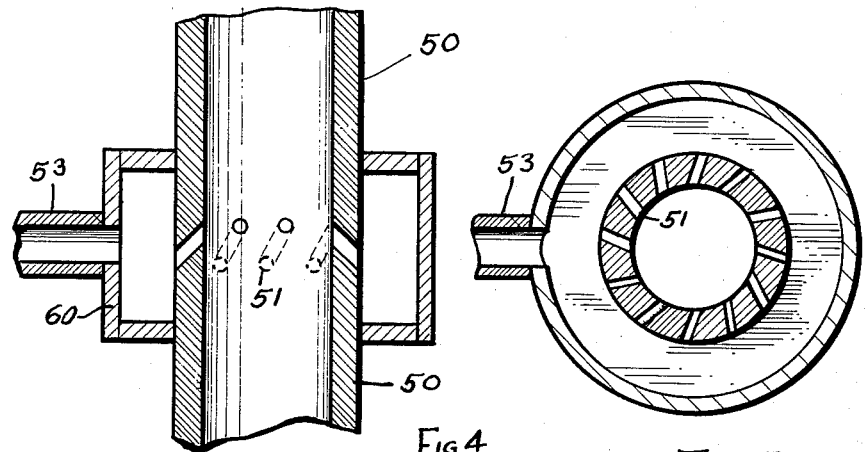

A United States Patent Office 3,251,471
Patented May 17, 1966

3,251,471
SEWAGE DISPOSAL SYSTEM
Robert D. Allen, 379 Niles-Cortland Road SE.,
Warren, Ohio
Filed Aug. 27, 1962, Ser. No. 219,532
4 Claims. (Cl. 210—197)

This invention relates to apparatus for the treatment of polluted liquids and liquid waste such as sanitary sewage and industrial waste and, more particularly, to a multi-compartment treatment apparatus therefor.

The primary purpose of treating organically polluted liquids, whether such liquids be in the nature of sanitary sewage or industrial waste, is to eliminae or minimize the nuisances and health hazards attendant to their discharge into bodies of water. Among the harmful effects arising from the discharge of untreated or insufficiently treated polluted liquids are the presence of solids, the generation of putrefactive odors, and the destruction of fish and other aquatic life in the receiving waters. In the large majority of cases, these effects are caused not only by properties of the polluting constituents themselves but, also, by their bacterial decomposition and the consequent depletion of the dissolved oxygen content of the receiving waters. The problem consequently resolves itself into providing means whereby the polluting constituents of waste flow are separated from the liquid and/or are stabilized under controlled conditions.

Treatment processes have been developed whereby the polluting constituents contained in waste flows may be so separated and stabilized. Broadly speaking, these processes may be classified according to the dissolved oxygen content of the liquid undergoing treatment. Those processes carried out in the presence of dissolved oxygen are referred to as being aerobic while those in which dissolved oxygen is not present are referred to as being anaerobic.

The apparatus utilized in these processes may be classified into two main groups. The first can be regarded as consisting of those which act solely as mechanical or physical separating means to remove solid polluting materials from the liquid and include devices such as bar racks, screens, and gravity settling clarifiers. The second group includes those devices which exert not only a physical function but, also, a bio-chemical one. This group may be exemplified by installations such as trickling filters, activated sludge aeration contact tanks, and digesters. Generally speaking, the devices of the first group may be used alone to accomplish so-called "primary" treatment or they may be used in conjunction with one or more devices of the second group to accomplish "complete" treatment.

In a typical installation for the treatment of organically polluted liquids, common practice has been to remove readily settable solids in a clarification station where quiescent conditions are maintained and wherein readily settling solids are permitted to deposit as a sludge on the bottom of the station. Clarified liquid from which a portion of the solids have thus been separated may, under certain circumstances, thereupon be disposed of or they may be subjected to additional treatment whereby dissolved, colloidal, and fine suspended solid material is removed. Sludges formed in the initial or primary clarifier, together with sludges derived from succeeding steps, if any, are generally removed to a digester station where, under anaerobic conditions, they are subjected to bacterial decomposition. The solids are liquefied or gasified, subsequent disposal is facilitated, and valuable gas is produced.

In order to provide compactness and economy of construction, it has, for many years, been the practice to provide for clarification by settling and for anaerobic sludge digestion in a single combined unit such as, for example, the well known Imhoff tank shown in Patents Nos. 978,889 and 1,642,206, for example, or the apparatus disclosed in Patent No. 1,925,679. Units of this type comprise two horizontally disposed chambers in vertical juxtaposition and in hydraulic communication with each other, the upper chamber serving as a settling or clarifying station through which liquid is passed directly from the influent means of the combined unit to the effluent means thereof. The lower chamber serves to anaerobically decompose solids removed by gravity from the polluted liquid in the course of passage of the said liquid through the upper compartment.

This process derives the benefit of diffused aeration (air bubbled from the bottom of a tank and impossible with the Imhoff design) and mechanical aeration (liquid pumped to the surface and splashed into the air by means of the rotary motion of an impeller). The liquid is conveyed at such a speed that the unrestricted pipes are self-cleaning and there are no moving parts (mechanical or structural) in the liquid of the tank. These two factors are not available elsewhere in sanitary treatment.

An equal volume of liquid travelling at a speed of two feet per second past the point of introduction of air into the liquid column by the air pump is uniformly mixed with the same volume of air. The pressure of the air entering the aeration pump need be no higher than two ounces more than the head pressure of the liquid being pumped at the point of introduction of the air into the aeration pump. The design of the aeration pump will have some variations. An example might be that at an aeration pump setting of thirty-two inches below the water level, less than an equal volume of air will move some liquid, a slightly higher setting will move a lesser volume of liquid, and a higher air pressure will also move a lesser volume of liquid per volume of air.

Holes are drilled in an upward direction at thirty degrees to sixty degrees and at a point which is one-half the distance from the center of the pipe to an outside edge at twenty-five degrees off center. Holes are equally spaced around the circumference of the pipe in a number as may vary with the diameter of the pipe, being large enough not to create a back pressure being generated on the air blower furnishing air to the aeration pump in excess of the desired back pressure (in this case, two ounces) and not so large as to allow liquid to enter the air introduction chamber of the aeration pump while air is escaping into the water column. The two ounce ideal setting distance between holes has been found to be as near three-eighth inch as can be equally drilled around the circumference of the water column tube and that the ideal diameter of these holes is in the area of .080 inch. It has been discovered that holes drilled smaller on one-fourth inch centers will work, but not as well.

It is, accordingly, an object of the present invention to provide a device for the complete treatment of sewage, all in the single apparatus of the type generally known as the Imhoff type.

Another object of the invention is to provide a treatment plant for sewage wherein the Imhoff and anaerobic processes are carried out in a single combined unit aerobic in nature.

A further object of the invention is to provide an improved plant for the treatment of sewage.

A still further object of the invention is to provide a treatment plant for sewage which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit of sacrificing any of the advantages of the invention.

In the drawings:

FIG. 1 is a cross sectional view of a device according to the invention taken on line 1—1 of FIG. 2;

FIG. 2 is a top view of the device shown in FIG. 1;

FIG. 3 is an isometric view of the aeration pump;

FIG. 4 is a vertical sectional view of the pump; and

FIG. 5 is a lateral cross sectional view of the pump.

Now with more particular reference to the drawings, FIG. 1 to 2 show a treatment plant which is laid out in a manner identical to the well known Imhoff type plant but the partitioning is changed and a device is applied whereby the complete process is carried out in a single tank. The process may be described as both mechanical and diffused aeration. This has not been possible heretofore in an Imhoff device.

The tank is generally divided into a primary digest chamber 11 and a sludge separation tank or chamber 12 separated from each other by a partition 16 and having vent slots 21 and 22 along each side thereof.

An inlet pipe 14 communicates with an inlet chamber 25 which, in turn, connects to the primary digest chamber 11 through an opening 26. The inlet chamber is separated from the sludge separation chamber 12 by a partition 30 and the primary digest chamber 11 is separated from an outlet chamber 27 by a wall 28. The setting chamber 40 is below the primary digest chamber and the separation chamber. A weir 23 connects the sludge separation chamber 12 with the outlet chamber 27 from where the fluid can flow to an outlet pipe 15.

Post chlorination is accomplished in the outlet chamber by a suitable chlorine dispeneser (not shown). This dispenser may be of any suitable design. Preferably, it is in the form of a tube slotted at the bottom for receiving chlorine tablets.

Aeration pumps 29 are connected to a source of air under pressure by pipes 50. The aeration pumps 29 can be spaced from each other inside of the vent slot in the partition 16. They can also be spaced along the length of the lateral vent slots 21 and 22 which are disposed at the sides of the tank.

The aeration pump is shown in FIGS. 3, 4, and 5. The areation pump is made up of the pipe 50 having holes 51 bored therein. Holes are drilled in an upward direction at an angle of from thirty to sixty degrees. By diffusing air bubbles in the liquid adjacent the bottom of the tank and by allowing the liquid circulated to the surface to be splashed into the air at the surface, the tank will treat the liquid much more efficiently than in prior designs. The liquid is conveyed at such a speed that the unrestricted pipe of the aeration device is self-cleaning and no moving parts are present in the aeration device.

The aeration pump has the main pipe 50 which extends from a point adjacent the bottom of the tank and is connected at its upper end to splash plates 24. Each pipe 50 has holes 51 drilled therein. These holes are drilled at an angle of approximately twenty-five degrees to a line extending from the center of the pipe to the inside of each hole. They are further inclined at an angle of forty-five degrees to the longitudinal axis of the pipe. The aeration pump has the collar 60 which forms a sleeve around the outside of it and to this sleeve is connected the air pipe 53 which could be connected to a suitable source of compresed air. The air from pipe 53 is discharged through the holes 51 into the steam of liquid inside the pipe. Thus, the liquid will be drawn with the air up through the pipe. Thus, the pipe and collar with the source of compressed air constitute a low pressure pump.

It has been discovered that an equal volume of liquid travelling in the pipe at a speed of two feet per second past the point of introduction of air at the holes 51 is uniformly mixed with the same volume of air. The pressure of the air entering the aeration pump need be no higher than two ounces greater than the head pressure of the liquid being pumped at the point of introduction of the air into the aeration pump.

The design of the aeration pump may have such variations that only the most advantageous of the dimensions are set forth. For example, with the aeration pump situated thirty-two inches below the water level, less than an equal volume of air will move some liquid, a slightly higher head setting and equal volume of air in a given time will move a lesser volume of liquid, and a higher air pressure will also move a lesser volume of liquid per volume of air.

It has also been discovered that it is advantageous to have the holes drilled in a direction of thirty degrees to sixty degrees from the radius of the pipe 50 and at a point which is one-half the distance from the center of the pipe to an outside edge. The holes 51 are equally spaced around the circumference of the pipe in such numbers as may vary with the diameter of the pipe. The holes are large enough not to create a back pressure being generated on the blower furnishing the air to the aeration pump in excess of the desired pressure (in the aforesaid example, two ounces) and not so large as to allow liquid to enter the air introduction chamber of the aeration pump while the air is escaping into the water column. The two ounce ideal setting distance between the holes has been found to be as nearly three-eighths of an inch as can be maintained around the circumference of the water column and the optimum diameter of the holes has been found to be .08 inch. Holes drilled with a spacing of one-quarter inch will work but not as well.

Thus, when air is forced into the pumps 29 and 31, liquid will be lifted through the pumps 29 and 31 and back into the chamber 11. This air from the pumps 29. 30, and 31 has many purposes.

(1) It circulates the liquid;
(2) It aerates the liquid;
(3) It inoculates the liquid with activated sludge; and
(4) It breaks down the solids into fine particles by turbulence and forcing solids against the splash plates 24.

It has been discovered that a low horsepower requirement air compressor will provide sufficient air to operate a relatively large size disposal plant by using the aeration principle disclosed herein. The air provides circulation to aerate the sewage.

The liquid is recirculated in volume, the fluid falling into the settling chamber 40 from the primary digest chamber 11 at such a rapid rate that the organic wastes held will remain aerobic. The air aeration pump is so constructed that there are no restrictive parts in the flow line of the sewage being lifted. The sewage flows to the surface at a calculated speed in an even flow. The air is introduced into the sewage in such a manner that small air bubbles do not tend to join together but afford the sewage the maximum surface area for oxygen absorption. The aeration pump requires a minimum of twenty ounces per square inch air pressure to function to bring sewage to the surface of the tank from a depth of twenty lineal feet.

The splash plates 24, in addition to acting as a means of breaking up large particles of solid oragnic wastes, also serve to divide the flow of the sewage carried by the pumps 29, 30, and 31 into a fan shaped flow, further adding oxygen in the fall through the atmosphere into the primary digest chamber 11. Thus, the sewage will be drawn up through the first slot in the partition 16, overflow onto the splash plates 24, and flow down through the slot between bottoms 17 and 18 into the chamber 40 and then into the separation chamber 12. All of the pumps 29, 30, and 31 will each have a splash plate 24 attached thereto. The pipes 50 are supported on brackets 70 which are fixed to the inside of the tank. The distal end of the bottom 17 underlies the bottom 18 defining a second slot. The distal end of bottom 19 underlies bottom 20. Thus, solid material is directed toward the center of the tank and toward a sludge withdrawal pipe 41.

The inlet pipe 14 may be connected to the inlet chamber 25 and water flows over the weir opening 26 into the chamber 11 while being mixed with activated sludge by the liquid supplied by the pump 30.

Sludge will also flow through the third slot between the bottoms 19 and 20 and be pumped over the partition against the splash plates 24 by pumps 29 in the partition 16 and thus back through the primary digest chamber 11. Treated sewage will flow over the weir 23 to the outlet chamber 27 and thence through the outlet pipe 15. The outlet chamber 27 may be used as a chlorination chamber with suitable chlorination means therein. Sewage is also constantly circulated by the pumps 30 and 31 which circulate and aerate liquid from the settling chamber 40 to the primary digest chamber 11 and the chamber 25.

The pumps 29, 30, and 31 can be of a suitable size; for example, three inches in diameter for an ordinary size disposal tank. Air is regulated through pipes 53 so that the liquid travels through the pipes at a speed of two feet per second and at a rate of fifty gallons per minute.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A sewage treatment device comprising
   a tank having an inlet and an outlet,
   a primary digest chamber and a sludge separation chamber in said tank and being spaced from one another and from the walls of said tank,
   the bottoms of said primary digest chamber and said sludge separation chamber being spaced from the bottom of said tank,
   an outlet chamber in said tank on one side of said primary digest chamber and said sludge separation chamber and connected to said outlet,
   means connecting said sludge separation chamber to said outlet chamber,
   an inlet chamber on the other side of said primary digest chamber and said sludge separation chamber and connected to said inlet,
   means connecting said inlet chamber to said primary digest chamber,
   a settling chamber below said primary digest chamber and said sludge separation chamber,
   means connecting the bottom of said primary digest chamber to said settling chamber,
   means connecting the bottom of said sludge separation chamber to said settling chamber,
   first pipe means extending from said settling chamber to a position above said primary digest chamber, and air means connected to said pipe means whereby fluid from said settling chamber can be discharged into the top of said primary digest chamber.

2. The sewage treatment device recited in claim 1 wherein said first pipe means extends from said settling chamber to a position above said primary digest chamber on two opposite sides of said primary digest chamber.

3. The treatment device recited in claim 1 wherein means is provided to dispense chlorine into said outlet chamber, and said means connecting said sludge separation chamber to said outlet chamber comprises a weir.

4. A disposal tank comprising
   an inlet chamber,
   inlet means in said tank in communication with said inlet chamber for delivering liquid to be treated,
   a primary digest chamber and a sludge separation chamber spaced from one another and located adjacent said inlet chamber,
   a weir in said tank providing communication between said inlet chamber and said primary digest chamber,
   an outlet chamber disposed adjacent said primary digest chamber and said sludge separation chamber,
   a second weir in said tank providing communication between said sludge separation chamber and said outlet chamber,
   outlet means in said tank in communication with said outlet chamber,
   a settling chamber below said primary digest chamber and said sludge separation chamber,
   said primary digest chamber and said sludge separation chamber each including a bottom spaced above said settling chamber,
   each bottom of said primary digest chamber and said sludge separation chamber including two portions sloping downwardly and toward one another,
   the two portions of each bottom of said primary digest chamber and said sludge separation chamber being spaced from one another at their lowermost extremity to communicate said settling chamber with each said primary digest chamber and said sludge separation chamber,
   pipes extending from said settling chamber upwardly through the space between said primary digest chamber and said sludge separation chamber,
   the upper ends of said pipes being disposed to discharge liquid into said primary digest chamber,
   a splash board associated with each of said pipes at the upper end thereof for directing liquid discharged from said pipes into said primary digest chamber,
   and means to direct air under pressure to said pipes to withdraw liquid from said settling chamber and discharge the same into said primary digest chamber.

References Cited by the Examiner

UNITED STATES PATENTS

| | | | |
|---|---|---|---|
| 145,538 | 12/1873 | Stoddart | 261—124 |
| 978,889 | 12/1910 | Imhoff | 210—195 X |
| 1,314,955 | 9/1919 | Flicker | 210—14 X |
| 1,642,206 | 9/1927 | Imhoff | 210—197 |
| 1,692,446 | 11/1928 | Imhoff | 210—220 |
| 1,925,679 | 9/1933 | Skinner | 210—319 |
| 2,413,838 | 1/1947 | Mallory | 210—221 X |
| 2,464,617 | 3/1949 | Sebald | 210—196 X |
| 2,638,444 | 5/1953 | Kappe | 210—194 |
| 2,822,157 | 2/1958 | Porter | 261—124 |
| 2,889,929 | 6/1959 | Kivell | 210—221 X |
| 2,901,114 | 8/1959 | Smith et al. | 210—256 X |

REUBEN FRIEDMAN, *Primary Examiner.*

ROBERT F. BURNETT, *Examiner.*